United States Patent [19]

Sumiyoshi et al.

[11] Patent Number: 5,153,897

[45] Date of Patent: Oct. 6, 1992

[54] AUTOMATICALLY CONTROLLING THE OPERATION MODE OF DATA CIRCUIT TERMINATING EQUIPMENT IN A COMMUNICATION SYSTEM

[75] Inventors: Kikuo Sumiyoshi; Kenichi Abe; Masumi Kaneuchi; Kenji Kurashina; Kenzou Kaji, all of Tokyo, Japan

[73] Assignees: Texas Instruments Japan Ltd.; NTT Data Communications Systems Corporation; Ohkura Electric Co., Ltd., all of Tokyo, Japan

[21] Appl. No.: 476,450

[22] PCT Filed: Sep. 27, 1989

[86] PCT No.: PCT/JP90/00976

§ 371 Date: Jul. 10, 1990

§ 102(e) Date: Jul. 10, 1990

[87] PCT Pub. No.: WO90/03701

PCT Pub. Date: Apr. 5, 1990

[30] Foreign Application Priority Data

Sep. 27, 1988 [JP] Japan ................................. 63-239783
Sep. 27, 1988 [JP] Japan ................................. 63-239784

[51] Int. Cl.[5] ...................... H04L 29/08; H04L 29/10; H04L 29/12
[52] U.S. Cl. ......................................... 375/8; 375/121; 379/93; 379/97
[58] Field of Search ................. 375/8, 9, 121; 370/24, 370/31; 379/93, 97, 98, 102, 105

[56] References Cited

U.S. PATENT DOCUMENTS

| | | | |
|---|---|---|---|
| 4,215,243 | 7/1980 | Maxwell | 375/8 |
| 4,471,489 | 9/1984 | Konetski et al. | 375/121 |
| 4,680,781 | 7/1987 | Amundson et al. | 375/8 |
| 4,691,342 | 9/1987 | Waldron et al. | 379/98 |
| 4,727,370 | 2/1988 | Shih | 375/121 |
| 4,742,482 | 5/1988 | Inskeep et al. | 375/8 |
| 4,788,657 | 11/1988 | Douglas et al. | 364/900 |
| 4,817,114 | 3/1989 | Boer et al. | 375/8 |
| 4,953,210 | 8/1990 | McGlynn et al. | 375/121 |
| 5,099,479 | 3/1992 | Boltz | 370/105.2 |

Primary Examiner—Benedict V. Safourek
Attorney, Agent, or Firm—Frishauf, Holtz, Goodman & Woodward

[57] ABSTRACT

The operation modes of a plurality of modems in a communication system are matched with each other for connection of digital terminals to an analog telephone line on both the calling and answering sides of the analog telephone line. For example, operation modes of modems on both sides of the analog telephone line can automatically be matched with each other by transferring a mode instructing signal with DTMF, using multi-frequency DTMF symbols for a select signal employed in the telephone line, between digital terminals connected to both ends of the telephone line. More specifically, even in the case of the calling and answering sides being in different initial operation modes, the different operation modes are matched by setting a desired operation mode on the calling side and generating an off-hook signal on the answering side in response to a calling signal, followed by (1) transmitting an operation mode instructing signal in the form of a code with DTMF from the calling side to the answering side, setting the instructed operation mode on the answering side and returning if it can be set on that side, and then returning an answer tone to the calling side for completing the mode matching; or when the operation mode instructed from the calling side cannot be set on the answering side, transmitting an operable mode in the form of a code with DTMF from the answering side to the calling side, and transmitting again the code corresponding to that mode from the calling side to the answering side if that mode can be set on the calling side, thereby matching operation modes of both the calling and answering sides, or (2) transmitting an operation mode instructing signal in the form of a code with DTMF from the answering side to the calling side, and then carrying out a procedure similar to above (1).

20 Claims, 11 Drawing Sheets

FIG. 10

| SYMBOL $ | LOWER GROUP FREQUENCY | HIGHER GROUP FREQUENCY |
|---|---|---|
| 1 | 697 Hz | 1209 Hz |
| 2 | 697 | 1336 |
| 3 | 697 | 1477 |
| 4 | 770 | 1209 |
| 5 | 770 | 1336 |
| 6 | 770 | 1477 |
| 7 | 852 | 1209 |
| 8 | 852 | 1336 |
| 9 | 852 | 1477 |
| 0 | 941 | 1336 |

AUTOMATICALLY CONTROLLING THE OPERATION MODE OF DATA CIRCUIT TERMINATING EQUIPMENT IN A COMMUNICATION SYSTEM

TECHNICAL FIELD

The present invention relates to a method of matching operation modes (i.e., operation forms determined by setting of a communication speed, a synchronizing mode, etc.), of data circuit terminating equipment (hereinafter called DCE) such as modems (modulators/demodulators) for connection of a terminal to a communications network on both the calling and answering sides of the communications network.

BACKGROUND OF THE INVENTION

Data communication using digital terminals connected to one another via analog telephone lines has become more prevalent, and modems for performing conversion of analog signals and digital signals from one to the other or vice versa between the digital terminals and the analog telephone lines have been used widely. More specifically, as shown in FIG. 1, a modem DCE has functions of receiving data in the form of a digital signal from a terminal DTE, modulating the input data with a predetermined modulation technique, and outputting an analog signal to the line side, while it also has functions of demodulating an analog signal sent from the opposite side via the line with a predetermined demodulation technique and outputting a demodulated digital signal to the terminal connected to the other end thereof. Thus, DTE1 and DTE2 on both the sides can perform data transfer simultaneously or alternately dependent on communication modes. There are various communication modes as follows:

(1) Full duplex . . . capable of inputting and outputting data simultaneously

Half duplex . . . inputting and outputting data alternately (only either one of inputting and outputting is possible at the same time)

(2) Modulation technique frequency modulation (FSK)

phase modulation (PSK)

quadrature modulation (QAM);

(3) Communication speed 300 bps (bps: number of transferred bits per second)

1200 bps 2400 bps 4800 bps 7200 bps 9600 bps.

(4) Data form synchronous asynchronous.

Various modes are created by diverse combinations of the above items (1), (2), (3) and (4). Thus, data transmission has variety in signal formats and transmission formats. To make matching with those different formats, some modems are equipped with various operation modes adaptable to the different formats. Further, as transmission standards, there are specified Recommendations from Consultative Committee of International Telegraph and Telephone (CCITT) V.21, V.22, V.22bis, V.23, V.26bis, V.27ter, V.29, etc.

For carrying out digital communication via telephone lines, it is essential to match operation modes of modems installed on both the calling and answering sides of a communication system.

A conventional mode matching method has been practiced by (a) manually setting a modem at the other party in advance, (b) setting the modem during the sequence for connection, or (c) replacing the modem with another one as required. However, such a conventional method requires the intricate process to make setting for matching of the modems after exchanging information related to connection conditions between the calling and answering sides prior to connection of a line, and to replace the modem itself with a new one when the setting cannot be completed. Another disadvantage is in that it is difficult for the conventional method to be adaptable for many kinds of operation modes and, even if possible, troublesome operation of shifting a multiplicity of switches is necessitated.

Another conventional method is known which gives an instruction from a terminal to a modem for changing an operation mode of the modem. In this method, however, because a command mode and a data mode are discriminated from each other, shifting from an asynchronous mode to a synchronous mode may become intricate, and shifting from the command mode to the data mode or from the data mode to the command mode may cause an adverse effect on communication which cannot be disregarded. Another disadvantage of this type modem is in that operation modes could not be matched with each other unless the operation of the modem at the other party is known. Accordingly, there has been a desire for a method capable of matching modem operation modes regardless of the operation mode of the opposite modem.

The present invention is to improve the disadvantages as mentioned above, and to provide a method by which operation modes of modems at the transmit and receive ends of a transmission line is automatically matched upon a control command from a terminal. This eliminates intricacy as encountered in the prior art shifting process.

DISCLOSURE OF THE INVENTION

To solve the foregoing problem, the present invention is, first, to provide a mode matching method that when communication is performed in a synchronous mode, a digital terminal connected to one end of a communications network is made operable, the terminal has means for instructing an operation mode of a DCE for the other party to the one-end DCE upon a control command, the operation mode being stored in advance, and the one-end DCE analyzes the control command to select operation mode reference data for setting the operation mode of the one-end DCE to a predetermined mode.

Secondly, the present invention is to provide a mode matching method that DCE's in different operation modes are connected one to either end of communications network, and the operation modes of both the DCE's can automatically be matched with each other by transferring a mode instructing signal with DTMF, using multi-frequency DTMF symbols for a select signal employed in the communications network, between digital terminals connected to the respective DCE's. More specifically, even in the case of the calling and answering sides being in different initial operation modes, a desired operation mode is set on the calling side upon start-up actuation of the calling side terminal and, after a hook is taken off on the answering side in response to a calling signal, the calling side transmits an operation mode instructing signal in the form of a code with DTMF to the answering side. The answering side sets the instructed operation mode if it can be set on that side, and then returns an answer tone to the calling side for completing the mode matching. If the operation mode instructed from the calling side cannot be set on the answering side, the answering side transmits an operable mode in the form of a code with DTMF to the calling side. If that mode can be set on the calling side, the code corresponding to that mode is transmitted again from the calling side to the answering side for matching operation modes of both the calling and answering sides.

Thirdly, the present invention is to provide a mode matching method which starts transmission of the operation mode instructing signal from the answering side, as a modification of the above second invention. More specifically, even in the case of the calling and answering sides being in different initial operation modes, a desired operation mode is set on the answering side upon actuation of the answering side terminal, and the answering side transmits an operation mode instructing signal in the form of a code with DTMF to the calling side. The calling side sets the instructed operation mode if it can be set on that side, and then returns an answer tone to the answering side for completing the mode matching. If the operation mode instructed from the answering side cannot be set on the calling side, the calling side transmits an operable mode in the form of a code with DTMF to the answering side. If that mode can be set on the answering side, the code corresponding to that mode is transmitted again from the answering side to the calling side for matching operation modes of both the calling and answering sides.

BRIEF DESCRIPTION OF THE DRAWINGS

FIG. 10 is one example of multi-frequency DTMF symbols for a select signal employed in the telephone line;

BEST MODE FOR CARRYING OUT THE INVENTION

Embodiment 1

Figure 1:
FIG. 1 shows an installation example of modems in the case of utilizing a public telephone line.
Figure 2:
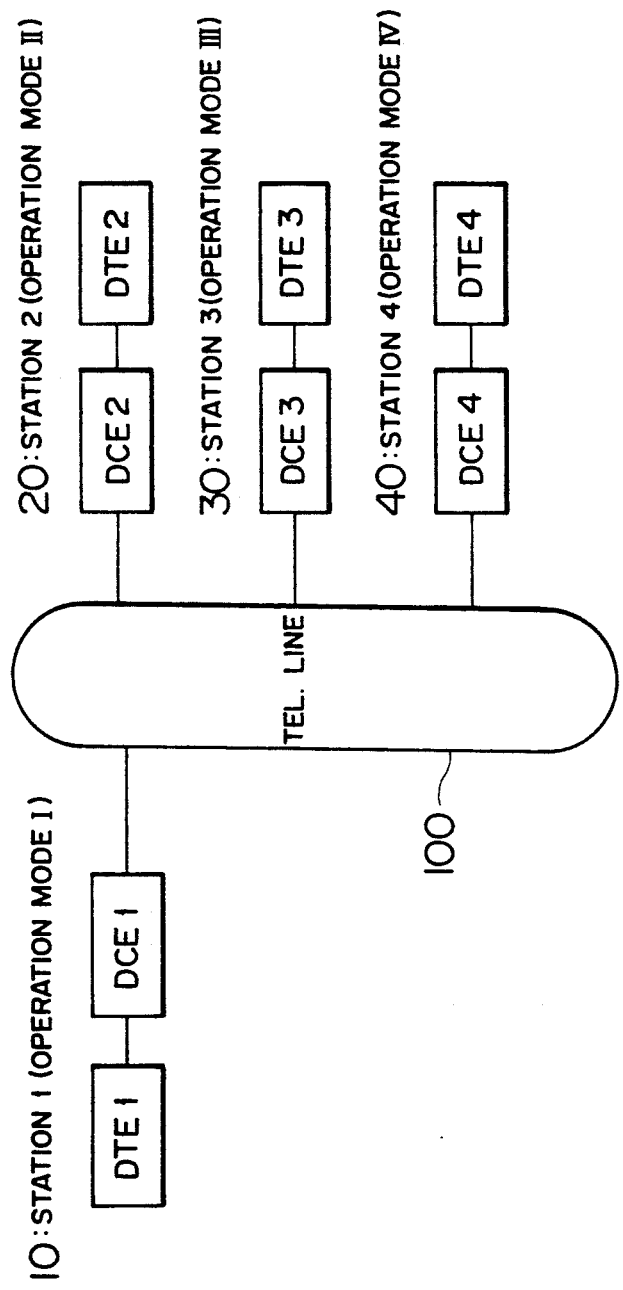
FIG. 2 is an explanatory view of a system emboying a matching method of the present invention.

FIG. 2 shows an outline of a system used for employing a first method of the present invention. Designated by reference numeral 10 is a station 1 comprising a digital terminal DTE1 and modem DCE1 which are both connected to one end of a telephone line 100 and operated in an operation mode 1. 20, 30 and 40 are stations 2, 3, 4 all connected to the other end of the telephone line 100 including a branch-exchange, comprising the same equipment as those of the station 1, and operated in operation modes 2, 3 and 4, respectively.

Figure 3:
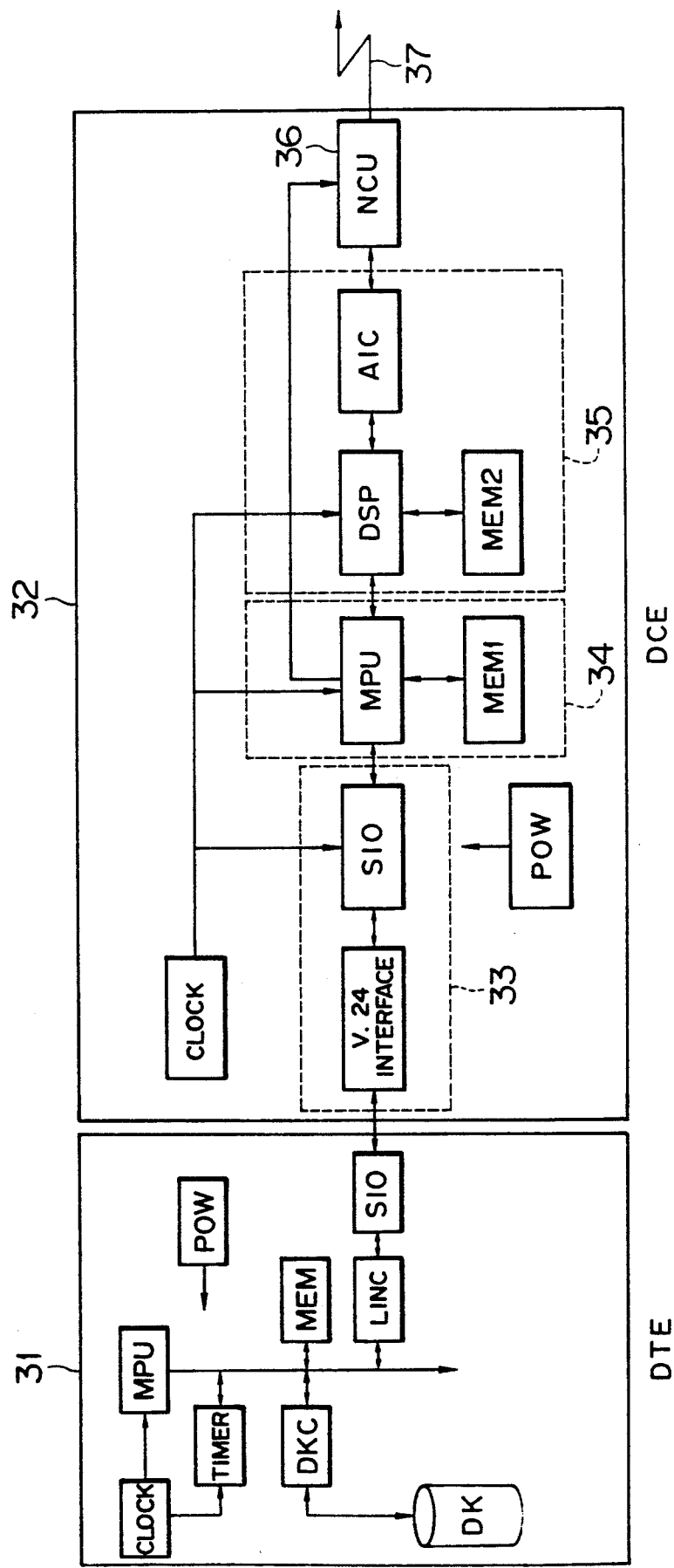
FIG. 3 is a block diagram showing the configuration of hardware of a terminal and a modem for implementing the method of the present invention.

In FIG. 3, a terminal 31 comprises a microprocessor MPU, a memory MEM, a clock CLOCK, a timer TIMER, a hard disk DK, a disk controller DKC, line controller LINC, a serial/parallel interface converter SIO, and a power supply POW. A modem 32 also comprises a MPU, CLOCK, SIO, MEM and POW as with the terminal 31. In addition to those, the modem 32 includes a digital signal processor DSP, an analog/digital converter AIC and a telephone line network control unit NCU. The terminal 31 and the modem 32 are connected to each other via the respective SIO's.

Functions of various components of the modem DCE will now be described.

SIO (Serial Input Output)

The SIO converts parallel data from the MPU to serial data for outputting the serial data to the DTE, and converts serial data from the DTE to parallel data for outputting the parallel data to the MPU.

MPU (Micro Processing Unit)

The MPU controls operation of the modem and performs management of a data flow. This is the center of modem control including dialogue on status with the DTE by the use of commands and indications, instruction to modulator/demodulator, control of the NCU, control of input and output of data, judgement and control of the modem operation mode, etc.

MEM1 and MEM2 (Memory)

These memories are connected to the MPU and the DSP, respectively, and store data and programs related to operation precedures of the MPU and the DSP.

DSP (Digital Signal Processor)

The DSP receives data from the DTE via the SIO and the MPU, modulates the received data and outputs the modulated data to the AIC. The AIC converts the data into an analog signal and outputs it to the telephone line via the NCU. On the contrary, an analog signal from the telephone line via the NCU is converted by the AIC to a digital signal which is then input to the DSP. The DSP demodulates the digital signal and outputs it to the MPU. The resulting data is output to the SIO via the DTE.

AIC (Analog Interface Circuit)

The AIC converts the digital signal from the DSP to an analog signal and outputs it to the NCU, while it converts the analog signal from the NCU to a digital signal and outputs it to the DSP.

NCU (Network Control Unit)

The NCU is to connect the modem and the telephone line and control of issuance and arrival of a call.

Figure 4:
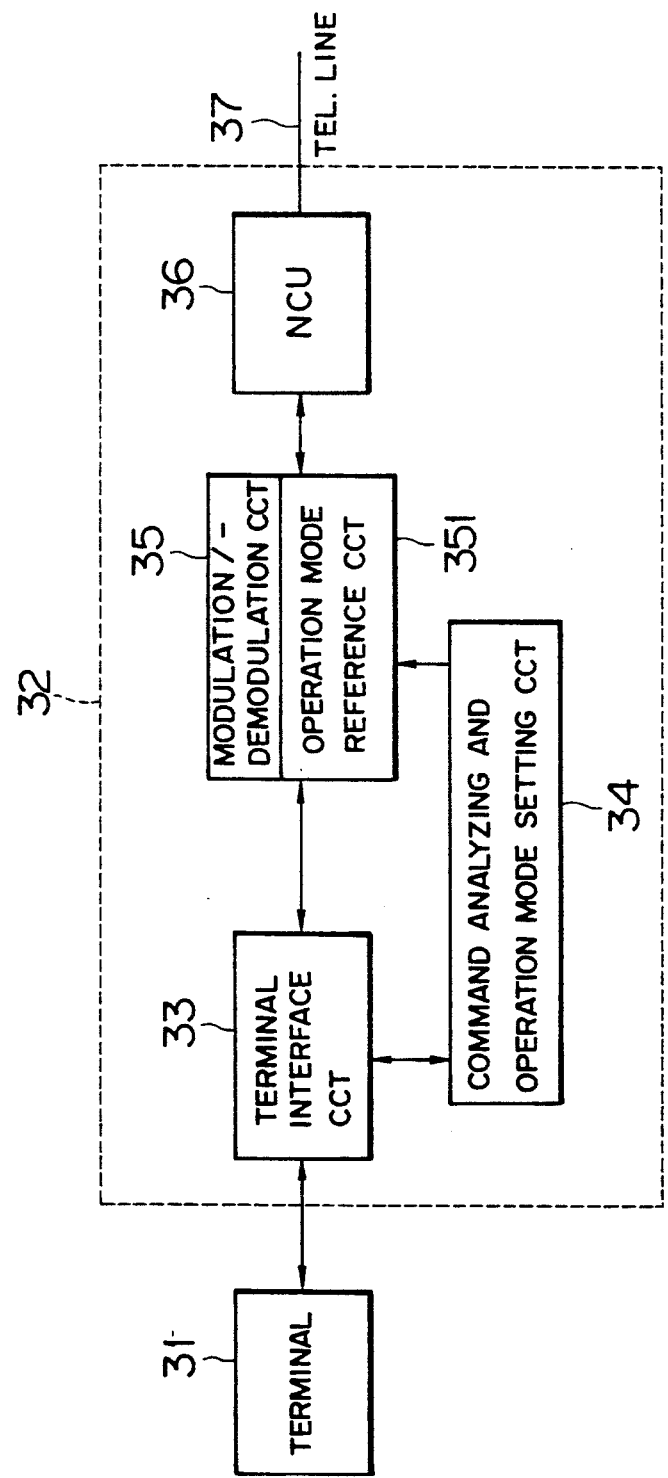
FIG. 4 is a functional block diagram of the modem.

FIG. 4 is a block diagram for explaining a function of the modem DCE1. A control command from the terminal 31 and an information signal to the terminal 31 are transferred via a terminal interface circuit 33 of the modem 32. A modulation/demodulation circuit 35 includes an operation mode reference data area 351, and a command analyzing and operation mode setting circuit 34 is provided between the modulation/demodulation circuit 35 and the terminal interface circuit 33. A control command input from the terminal to the circuit 34 via the interface circuit 33 is subjected to analysis of the command and, thereafter, the operation mode setting circuit selects the data for a modem operation mode corresponding to the control command, thereby setting an operation mode of the modulation/demodulation circuit 35 to be matched with that at the other party. As with a usual modem, the modem 32 is connected to a telephone line 37 via the NCU 36.

The above process will be explained again with reference to the block diagram of the modem shown in FIG. 3.

When the terminal DTE outputs a command determining an operation mode to the modem, the command is input to the MPU via the SIO. The MPU interprets the command which has been prescribed in advance, and selects a corresponding operation mode. In order to operate the modem in the selected operation mode, the MPU informs or notifies that mode to the DSP for mode setting. A manner of setting the DSP to the instructed operation mode is mainly divided to two kinds of methods. In the first method, all or most of data and information necessary for enabling the DSP to work in the instructed operation mode are read by the MPU out of the memory MEM1 associated with the MPU, and then applied to the DSP. In other words, the necessary data is downloaded from the MPU to the DSP. In the second method, only a code of the operation mode is informed to the DSP, whereupon the DSP itself reads the data necessary for itself out of the memory MEM2 associated with the DSP and makes setting by itself so as to establish the operation mode corresponding to that code. In either method, after completion of setting the modem operation mode by the MPU and the DSP, the MPU informs the completion of the operation to the DTE via the SIO.

Figure 5:
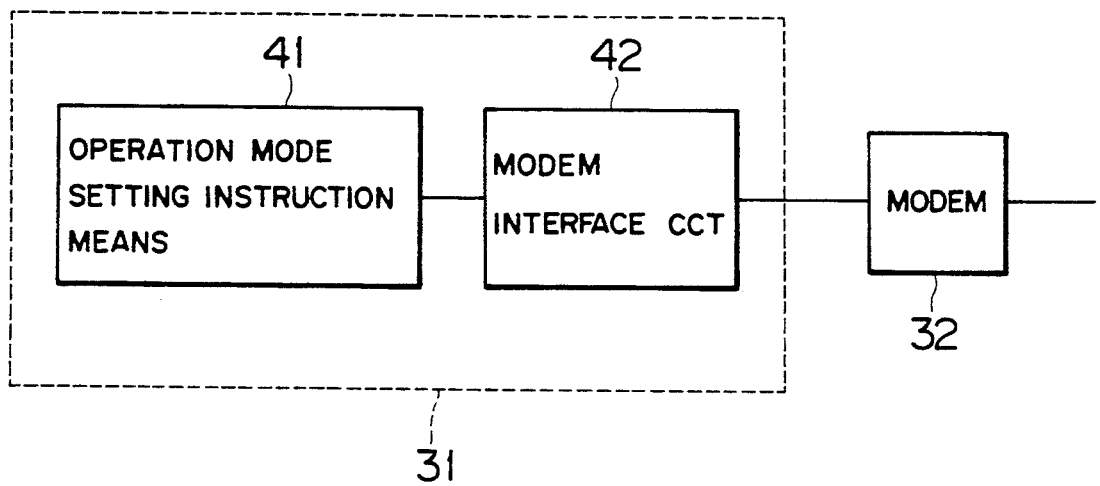
FIG. 5 is a functional block diagram of the terminal.

FIG. 5 is a block diagram for explaining a function of the terminal DTE1. The terminal 31 includes operation mode setting instruction means 41 and is connected to the modem 32 via a modem interface circuit 42.

By referring to the above-mentioned drawings, before issuance or arrival of a call from or to the DTE1 and DCE1, the DTE1 instructs the DCE1 to set an operation mode corresponding to that of any one of the modems DCE2, DCE3, DCE4 connected to the other end of the telephone line, whereby the operation mode of the DCE1 is changed to be matched with that of the opposite modem.

Figure 6:
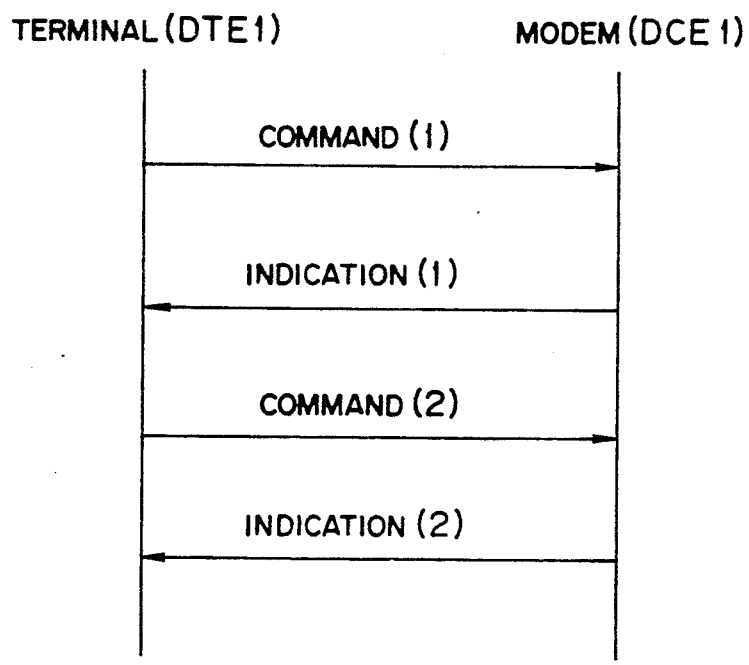
FIG. 6 is a chart showing the communication procedure between the terminal and the modem.

The mode control command applied from the terminal is input to the modem interface circuit connecting the terminal and the modem via the standard interface specified in CCITT Recommendation V.24. As shown in FIG. 6, the command is analyzed by the command analyzing and operation mode setting circuit 34, and an indication in the form of an answer tone corresponding to the command (referred to simply as a indication hereinafter) is output to the terminal. At this time, the operation mode setting circuit sets the data corresponding to the command from terminal into a memory area referred to as the operation mode reference data area. This permits the modem to operate in the operation mode instructed from the terminal in accordance with the set data.

EMBODIMENT 2

Figure 7:
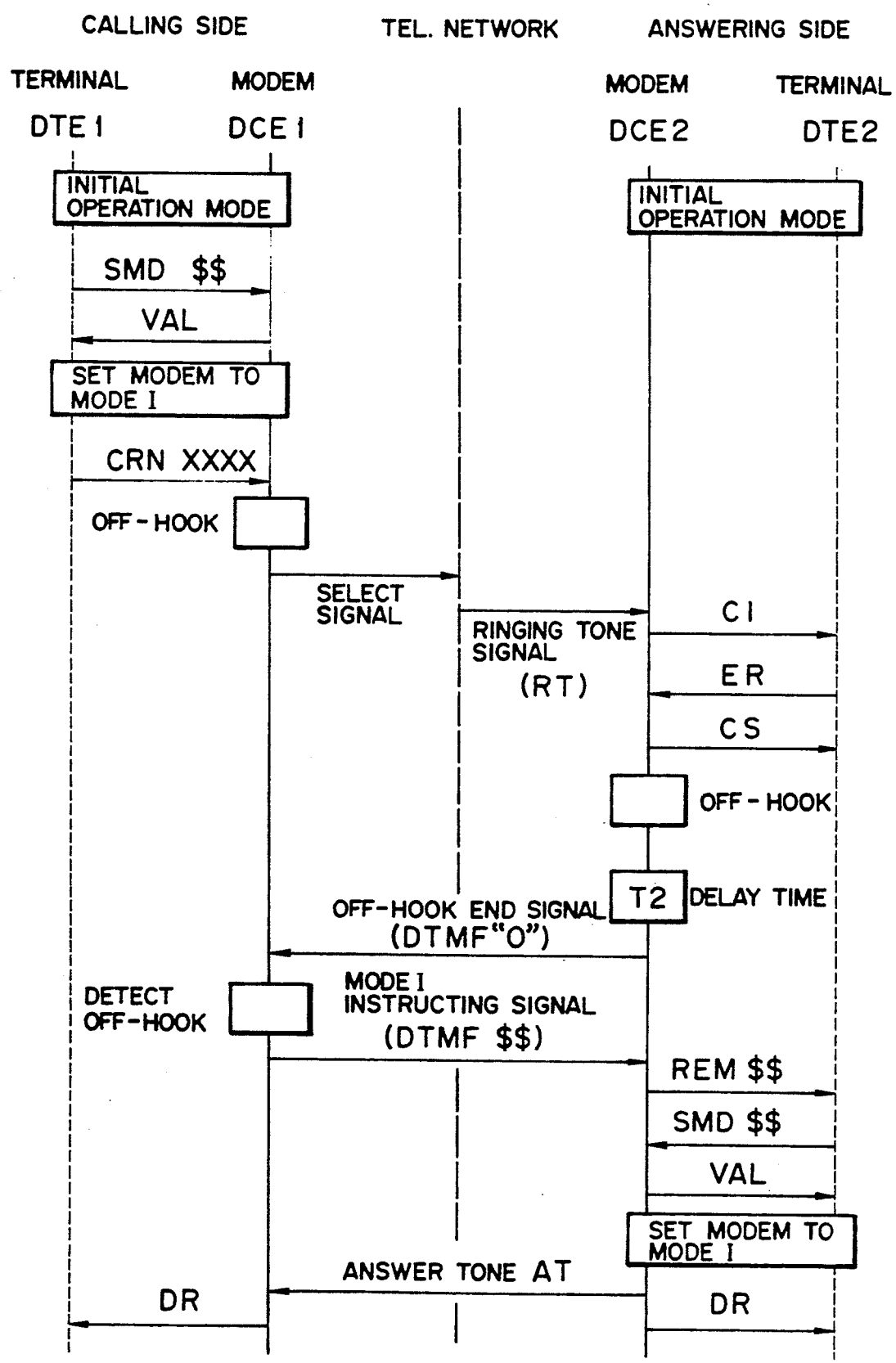
FIGS. 7 and 8 are charts showing the communication procedures of other methods of the present invention.

FIG. 7 is a chart for explaining a method of matching modem using a tone signal according to a second embodiment of the present invention. Respective operation modes of modems DCE1 and DCE2 installed at both the ends of the telephone line are represented by a mode instructing signal DTMF$$ in the form of a combined code of multi-frequency symbols for a select signal employed in the telephone line (referred to simply as DTMF (Dual-Tone Multi-Frequency) symbols hereinafter). FIG. 10 shows one example of the DTMF symbols employed in the present invention. Although $$ is given by a number of 2 digits for convenience of explanation, this is intended only to be illustrative and any number of digits can instead be selected other than two digits.

The modems DCE1 and DEC2 are each a device comprising a modem circuit and a telephone line network control unit NCU combined with each other. The modem circuit can be adapted for a plurality of modes and selected any one mode through mode setting.

The modem DEC1, DCE2 and digital terminals DTE1, DTE2 used for implementing the method of the present invention are constructed similarly to the above first embodiment and shown in FIG. 3.

In FIG. 7, it is assumed that prior to start of operation, the DTE1, and the DCE1 on the calling side are in a state of initial operation mode I and those on the answering side are in a state of initial operation mode II.

When the operation starts, the calling side terminal DTE1 sends an operation mode I setting signal SMD$$ to the modem DCE1. This $$ is given by two DTMF digits corresponding to the mode I. The modem DCE1 responds to the operation mode I setting signal SMD$$ immediately after start-up on the calling side, and returns a validation signal VAL to the terminal DTE1, whereby an internal line on the calling side between the terminal DTE1 and the modem DCE1 is set to the desired operation mode I. Then, the calling side modem DCE1 sends out a select signal, such as given by a format of call request CRNXXXX in accordance with CCITT Recommendation V.25bias, to the telephone line. This signal XXXX is a train of digits representing a telephone number of the answering side.

The answering side takes off a hook in response to a ringing tone signal RT, following the predetermined procedure such as prescribed in CCITT Recommendation V.25bis. With the typical off-hook procedure, upon arrival of the ringing tone signal RT, a calling indicating signal CI is sent from the modem DCE2 to the terminal DTE2, whereupon the terminal DTE2 returns a termianl ready signal ER to the modem DCE2. Upon receipt of the terminal ready signal ER, the modem DCE2 sends a clear-to-send signal CS to the terminal DTE2, followed by the off-hook. After elapse of a delay time T2 necessary for the off-hook to be informed to the calling side, the modem DCE2 sends out an off-hook end signal (a symbol of DTMF"O" in the illustrated example) to the calling side.

On condition that the off-hook has been detected upon arrival of the off-hook end signal, the calling side sends out a mode I instructing signal (in the form of code symbols DTMF$$ corresponding to the mode I) to the answering side.

On condition that the mode I instructing signal has arrived immediately after sending the off-hook end signal, a mode I notifying signal REM is sent from the modem DCE2 to the terminal DTE2 on the answering side. Also, on condition that the mode I can be set on the answering side, the terminal DTE2 sends a mode I setting signal SMD$$ to the modem DCE2. The modem DCE2 returns a validation signal VAL to the terminal DTE2, whereby an internal line on the answering side between the terminal DTE2 and the modem DCE2 is set to the desired operation mode I.

Thus, the modem at the both ends of the telephone line, i.e., on the calling and answering sides, are automatically matched to the same operation mode, i.e., the operation mode I in this case, so that the object of the present invention is achieved.

Afterward, the answering side sends an answer tone AT to the calling side, whereby a communicable state is established. Specifically, transmit/receive ready signals DR are sent from the modems to the associated terminals on both the sides for starting communication.

Although the above explanation has been based on timing relation between transfer of the mode I instructing signal and the off-hook signal, the present invention is not limited to the foregoing example.

Figure 8:
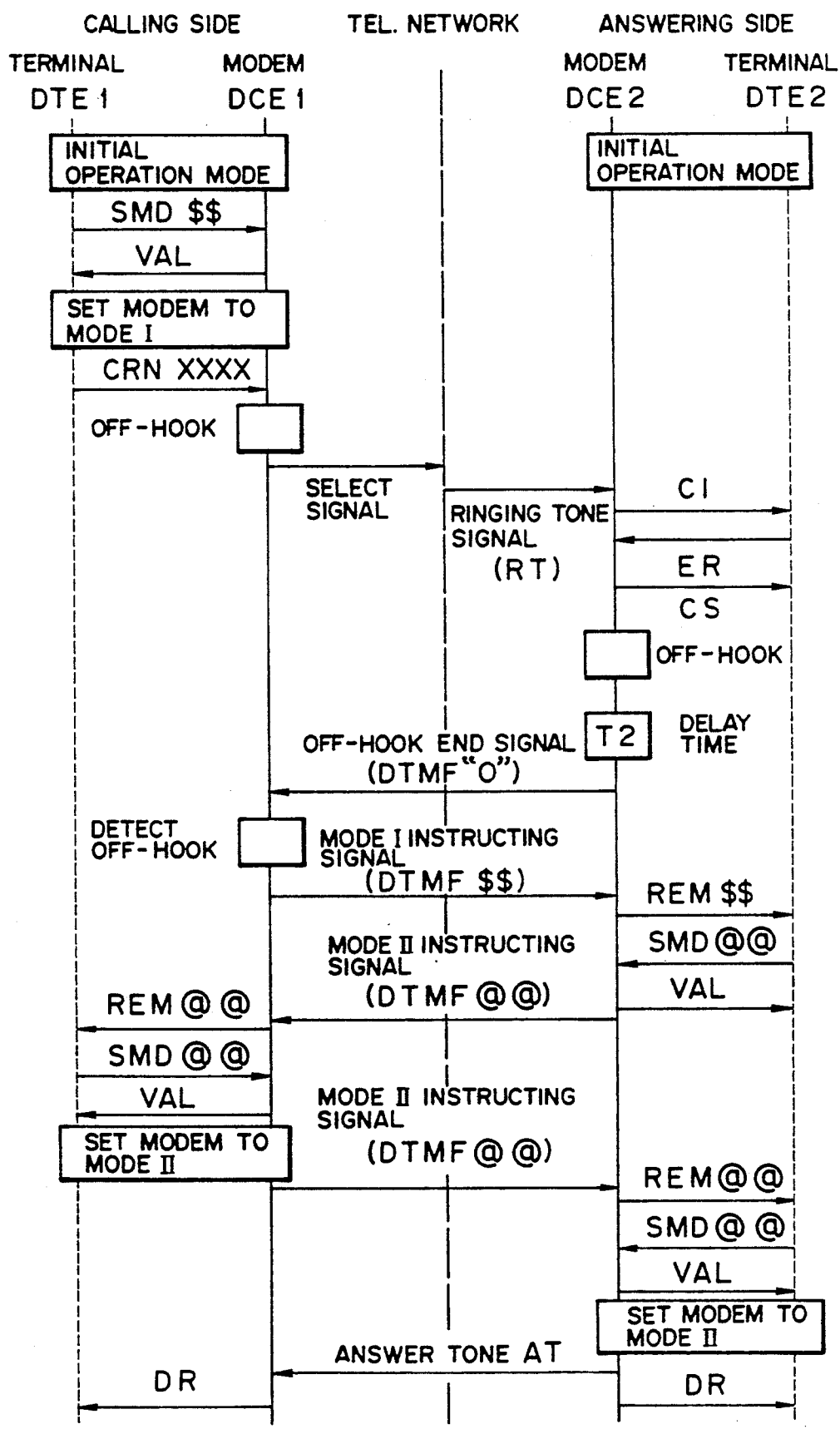
Figure 9:
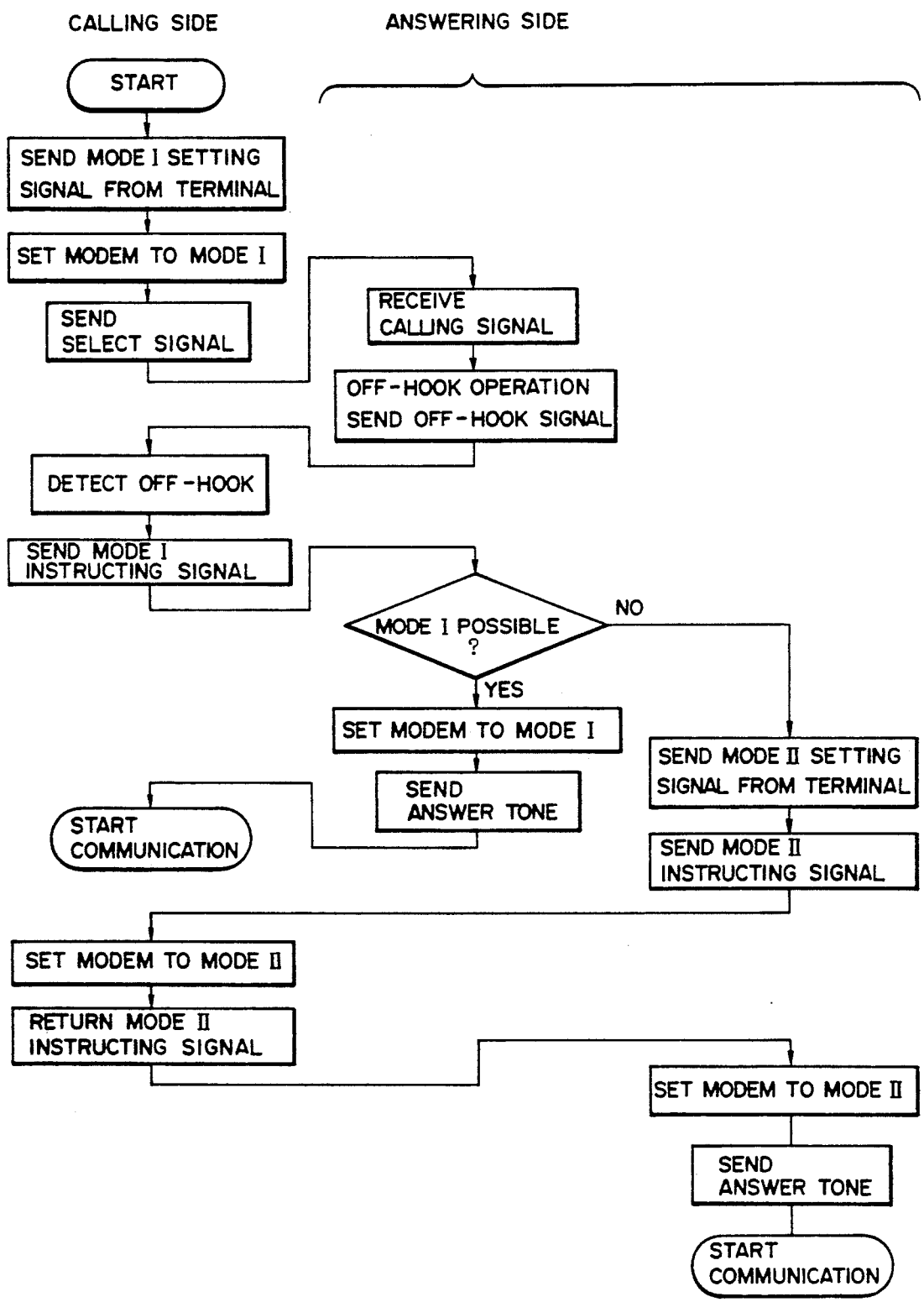
FIG. 9 is a flowchart for explaining other methods of the present invention shown in FIGS. 7 and 8.

Next, a matching method in the case where the answering side has not the operation mode instructed by the calling side will be described with the reference to FIGS. 8 and 9.

As with the case of FIG. 7, upon receiving the mode I instructing signal DTMF$$ from the calling side, the modem DCE2 on the answering side sends the mode I notifying signal REM$$ to the terminal DTE2. In the case of FIG. 8, however, since the terminal DTE2 has not the operation mode requested by the calling side, a mode II setting signal SMD@@ as a request for changing to one of operation modes stocked the terminal DTE2 is sent to the modem DCE2. The modem DCE2 returns a validation signal VAL to the terminal DTE2 and also sends out a mode II instructing signal DTMF@@ as a change request to the calling side. Based on the fact that a signal from the answering side responding to the mode I instructing signal DTMF$$ sent out of the calling side immediately before is given by not the answer tone AT, but the mode II instructing signal DTMF@@, the calling side recognizes the operation mode change request from the answering side. The modem DCE1 on the calling side then sends a mode II notifying signal REM@@ to the terminal DTE1.

Correspondingly, the terminal DTE1 applies a mode II setting signal SMD@@ to the modem DCE1.

In response to the setting signal SMD@@, the modem DCE1 returns a validation signal VAL to the terminal DTE1, whereby the internal line between the terminal DTE1 and the modem DCE1 is set to the desired operation mode II. After that setting, the modem DCE1 sends out the mode II instructing signal DTMF@@ to the answering side. The answering side sets the operation mode to the mode II through the same proocedure as that on the calling side, and then sends out an answer tone AT to the calling side so that a communicable state is established. Thus, in the example of FIG. 2, the modems at the both calling and answering sides can also automatically be matched to the same operation mode II.

EMBODIMENT 3

A third embodiment is the case where the answering side first instructs an operation mode to the calling side.

A matching method in the case where the calling side has the operation mode instructed from the answering side will now be described with reference to FIG. 11.

Modems DCE1 and DCE2 are each a device comprising a modem circuit and a telephone line network control unit NCU combined with each other. The modem circuit can be adapted for a plurality of modes and select any one mode through mode setting.

The modems DCE1, DCE2 and digital terminals DTE1, DTE2 used for implementing the method of the present invention are constructed similarly to the above first embodiment and shown in FIG. 3.

Figure 11:
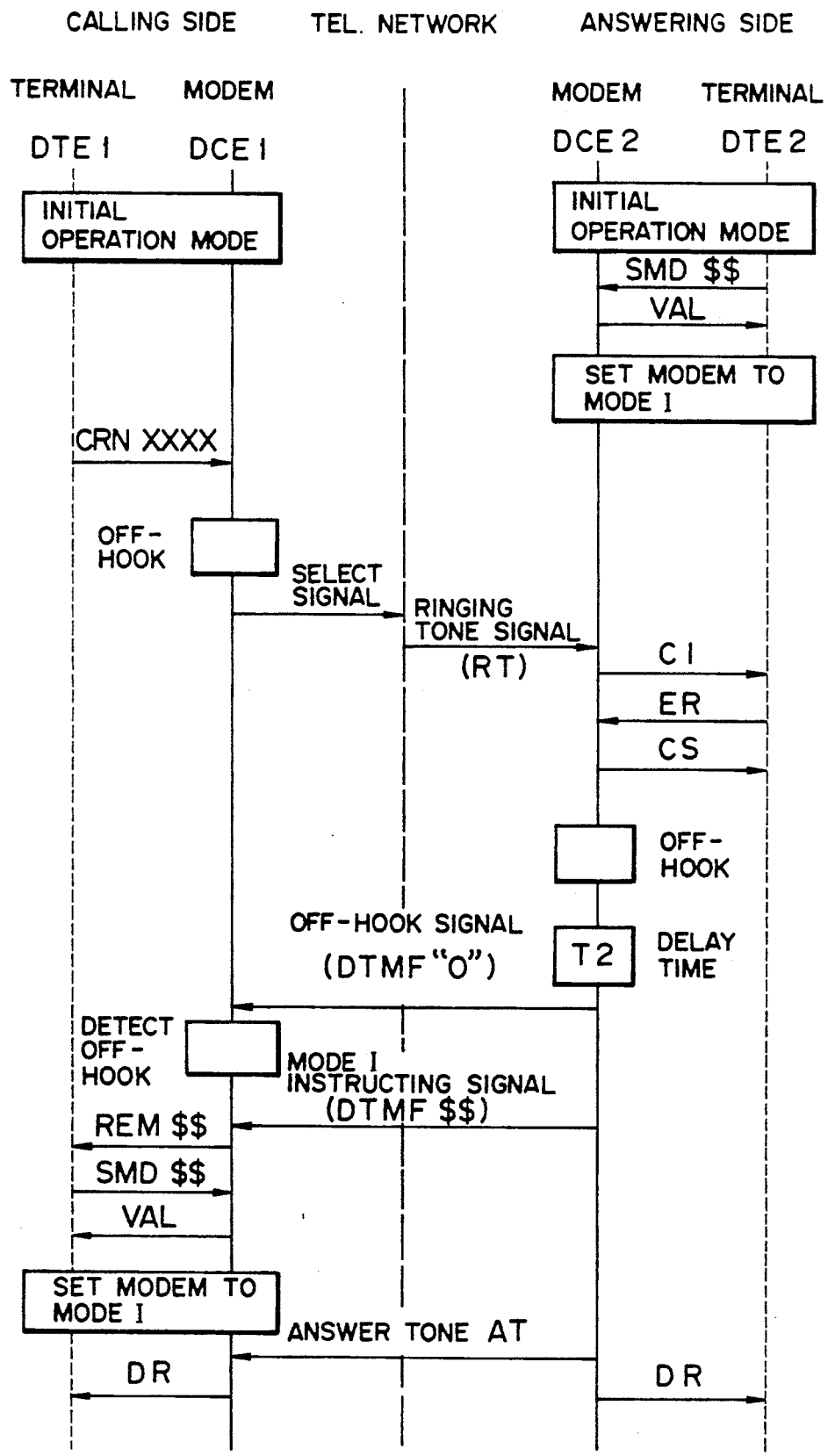
FIGS. 11 and 12 are charts showing the communication procedures of still other methods of the present invention.

In FIG. 11, it is assumed that prior to start of operation, the DTE1 and the DCE1 on the calling side are in a state of initial operation mode I and those on the answering side are in a state of initial operation mode II.

When the operation starts, the answering side terminal DTE2 sends an operation mode I setting signal SMD$$ to the modem DCE2. This $$ is given by two DTMF digits corresponding to the mode I. The modem DCE2 responds to the operation mode I setting signal SMD$$ immediately after start-up on the calling side, and returns a validation signal VAL to the terminal DTE2, whereby an internal line on the calling side between the terminal DTE2 and the modem DCE2 is set to the desired operation mode I. Then, the calling side modem DCE1 sends out a select signal, such as given by a format of call request CRNXXXX in accordance, with CCITT Recommendation V.25 bis, to the telephone line. This signal XXXX is a train of digits representing a telephone number of the answering side.

The answering side takes off a hook in response to a ringing tone signal RT, following the predetermined procedure such as prescribed in CCITT Recommendation V. 25 bis. With the typical off-hook procedure, upon arrival of the ringing tone signal RT, a calling indicating signal CI is sent from the modem DCE2 to the terminal DTE2, whereupon the terminal DTE2 returns a terminal ready signal ER to the modem DCE2. Upon receipt of the terminal ready signal ER, the modem DCE2 sends a clear-to-send signal CS to the terminal DTE2, followed by the off-hook. After elapse of a delay time T2 necessary for the off-hook to be informed to the calling side, the modem DCE2 sends out an off-hook end signal (a symbol of DTMF"0" in the illustrated example) to the calling side.

The calling side detects the off-hook upon arrival of the off-hook end signal. The answering side sends out a mode I instructing signal (in the form of code symbols DTMF$$ corresponding to the mode I) to the calling side.

On condition that the mode I instructing signal has arrived after detection of the off-hook end signal, a mode I notifying signal REM is sent from the modem DCE1 to the terminal DTE1 on the calling side. Also, on condition that the mode I can be set on the calling side, the terminal DTE1 sends a mode I setting signal SMD$$ to the modem DCE1. The modem DCE1 returns a validation signal VAL to the terminal DTE1, whereby an internal line on the calling side between the terminal DTE1 and the modem DCE1 is set to the desired operation mode I.

Thus, the modems at the both ends of the telephone line, i.e., on the calling and answering sides, are automatically matched to the same operation mode, i.e., the operation mode I in this case, so that the object of the present invention is achieved.

Afterward, the answering side sends an answer tone AT to the calling side, whereby a communicable state is established. Specifically, transmit/receive ready signals DR are sent from the modems to the associated terminals on both the sides for starting communication.

Although the above explanation has been based on timing relation between transfer of the mode I instructing signal and the off-hook signal, the present invention is not limited to the foregoing example.

Figure 12:
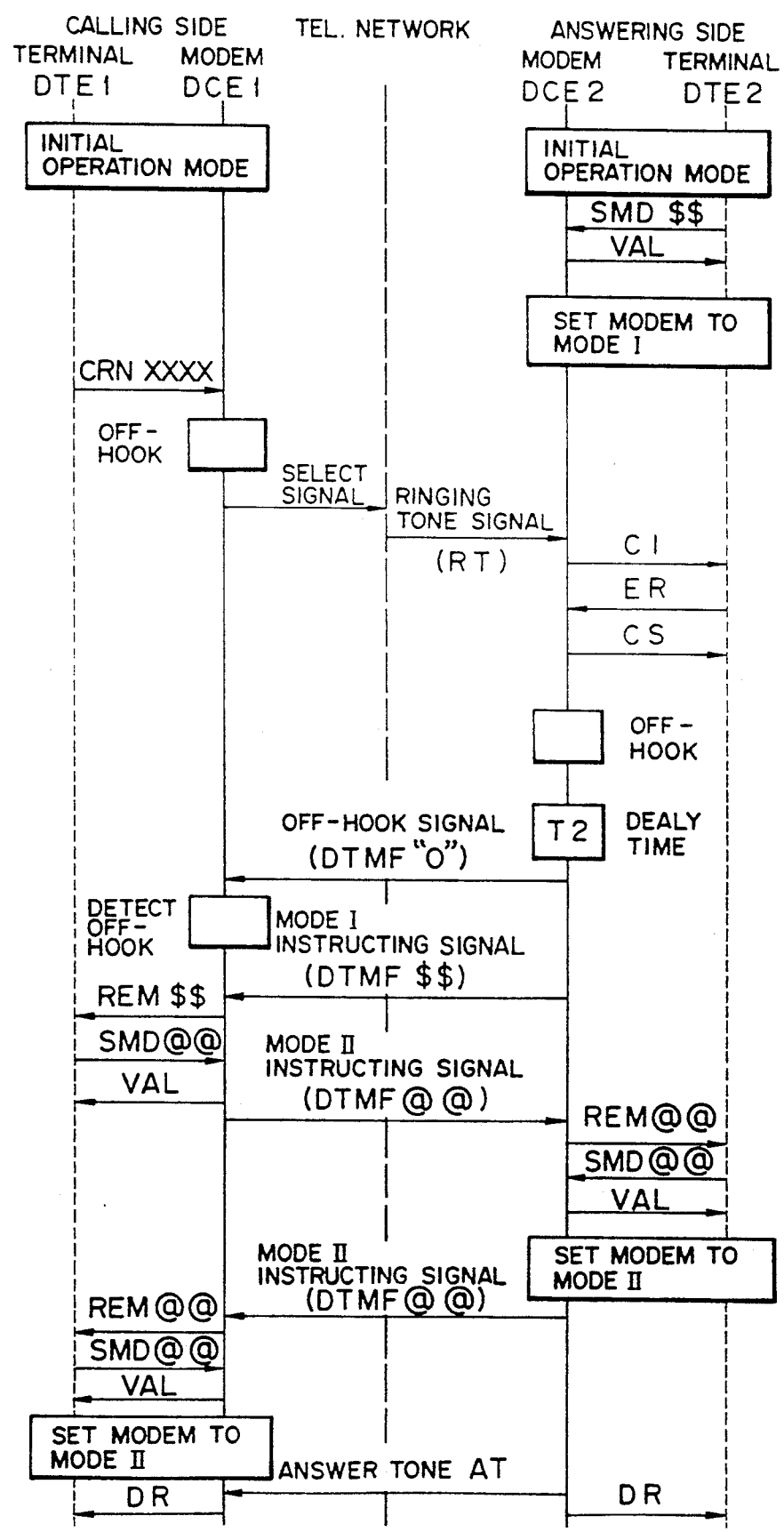

Next, a matching method in the case where the calling side has not the operation mode instructed by the answering side will be described with reference to FIG. 12.

As with the case of FIG. 11, upon receiving the mode I instructing signal DTMF$$ from the answering side, the modem DCE1 on the calling side sends the mode I notifying signal REM$$ to the terminal DTE1. In the case of FIG. 12, however, since the terminal DTE1 has not the operation mode requested by the answering side, a mode II setting signal SMD@@ as a request for changing to one of operation modes stocked in the terminal DTE1 is sent to the modem DCE1. The modem DCE1 returns a validation signal VAL to the terminal DTE1 and also sends out a mode II instructing signal DTMF@@ as a change request to the answering side. Based on the fact that a signal from the calling side responding to the mode I instructing signal DTMF$$ sent out of the answering side immediately before is given by the mode II instructing signal DTMF@@, the answering side recognizes the operation mode change request from the calling side. The modem DCE2 on the answering side then sends a mode II notifying siganl REM@@ to the terminal DTE2.

Correspondingly, the terminal DTE2 applies a mode II setting signal SMD@@ to the modem DCE2.

In response to the setting signal SMD@@, the modem DCE2 returns a validation signal VAL to the terminal DTE2, whereby the internal line between the terminal DTE2 and the modem DCE2 is set to the desired operation mode II. After that setting, the modem DCE2 sends out the mode II instructing signal DTMF@@ to the answering side. The calling side sets the operation mode to the mode II through the same procedure as that on the answering side, and the answering side then sends out an answer tone AT to the calling side so that a communicable state is established. Thus, in the example of FIG. 12, the modems at the both calling and answering sides can also automatically be matched to the same operation mode II.

Figure 13:
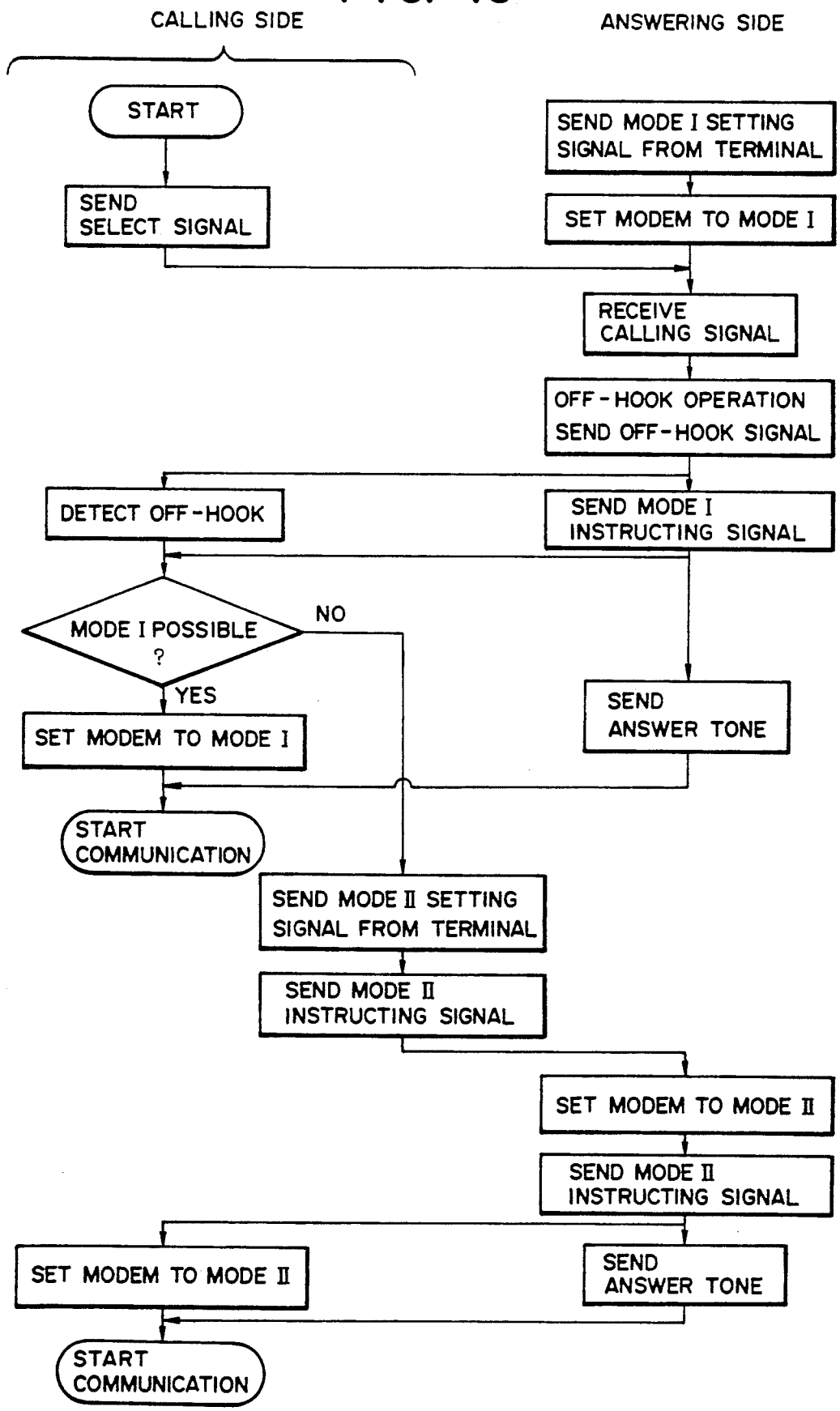
FIG. 13 is a flowchart for explaining the still other methods of the present invention shown in FIGS. 11 and 12.

FIG. 13 shows the above-mentioned operating procedures in the form of a flowchart.

With the present invention, since the terminal can select an operation mode and directly set the selected mode to the modem, it becomes possible to (1) eliminate trouble or labor as otherwise needed in setting and changing the operation mode by intricate manual work, and (2) allow communication with various modems having different operation modes.

What is claimed is:

1. A method for controlling a communications system by matching an operation mode of a first data circuit terminating equipment ("DCE") with an operation mode of at least a second DCE, said communications system including a first terminal coupled to a communications netwoork via said first DCE, and a second terminal coupled to said communications network via said second DCE, said first and second terminals respectively communicating with said first and second DCE's in a synchronous mode, wherein said method comprises the steps of:

storing an initial operation mode of said second DCE in a memory of said first terminal;
   sending from the first terminal to the first DCE an operation mode setting command corresponding to said initial operation mode before said first terminal issues to or receives from the communications network a call via said first DCE;
   analyzing with the gfirst DCE said operation mode setting command; and
   controlling said first DCE to have an operation mode which matches said initial operation mode of said second DCE in response to a result of said analyzing step.

2. A method for controlling a communications system by matching an operation mode a first modem with an operation mode of at least a second modem, said communications system including a first terminal coupled to an analog telephone line via said first modem, and a second terminal coupled to said analog telephone line via said second modem, said first and second modems respectively communicating with said first and second terminals in a synchronous mode, wherein said method comprises the steps of:

storing an initial operation mode of said second modem in a memory of said first terminal;
   sending from the first terminal to the first modem an operation mode setting command corresponding to said inital operation mode before said first terminal issues to or receives from the analog telephone line a call via said first modem;
   analyzing with the first modem said operation mode setting command; and
   controlling said first modem to have an operation mode which matches said initial operation mode of said second modem in response to a result of said analyzing step.

3. A method for controlling a communications system by matching an operation mode of a first circuit terminating equipment ("DCE") with an operation mode of at least a second DCE, said communications system including a first terminal equipment ("DTE") coupled to a communications network via said first DCE, and second DTE coupled to said communications network via said second DCE, wherein said method comprises the steps of:

providing said first DCE with a first set of selected operation modes, and providing said second DCE with a second set of selected operation modes such that said first and second DCE's can be set to operate in any one said first and second sets of selected operation modes, respectively;
   storing operation mode command signals in said first DTE corresponding to said first set of selected operation modes, and storing in said second DTE operation mode command signals corresponding to said second set of selected operation modes;
   transmitting from said first DTE to said first DCE one of said operation mode command signals corresponding to said first set of selected operation modes in accordance with a start-up operation triggered by said first DTE;
   following receipt by the second DCE of a ringing tone signal, transmitting said one operation mode command signal from said first DCE to said second DCE after a connection has been completed therebetween via said communications network;
   if said one operation mode command signal corresponds to an operation mode included in the second set of selected operation modes, setting an operation mode of said second DCE to the operation mode corresponding to said one operation mode command signal;

transmitting an answer signal from the second DCE to the first DCE; and transmitting a transmission/receipt ready signal from the first and second DCE's respectively, the first and second DTE's after said match has occurred.

4. The method for controlling a comminications system of claim 3, further comprising the steps of:

if said one operation mode command signal does not correspond to an operation mode included in the second set of selected operation modes, transmitting from said second DCE to said first DCE another operation mode command signal which corresponds to an operation mode in the second set of selected operation modes;

if said other operation mode command signal corresponds to an operation mode included in the first set of selected operation modes, setting an operation mode of said first DCE to the operation mode corresponding to said other operation mode command signal;

transmitting said other operation mode command signal from the first DCE to said second DCE;

setting an operation mode of said second DCE to the peration mode corresponding to other operation mode signal received from said first DCE;

transmitting said answer signal from the second DCE to the first DCE; and transmitting said transmission/receipt ready signal from the first and second DCE's to, respectively, the first and second DTE's after said match has occurred.

5. A method for controlling a communications system by matching an operation mode of a first modem with an operation mode of at least a second modem, said communications system including a first terminal coupled to an analog telephone line via said first modem, and a second terminal coupled to said analog telephone line via said second modem, wherein said method comprises the steps of:

providing said first modem with a first set of selected operation modes, and providing said second modem with a second set of selected operation modes such that said first and second modems can be set to operate in any one of said first and second sets of selected operation modes, respectively;

storing operation mode command signals in said first terminal corresponding to said first set of selected operation modes, and storing in said second terminal operation mode command signals corresponding to said second set of selected operation modes, said operation mode command signals being comprised of combined codes composed of mulyi-frequency DTMF codes;

transmitting from said first terminal to said first modem one of said operation mode command signals corresponding to said first set of selected operation modes in accordance with a start-up operation triggered by said first terminal;

following receipt by the second modem of a ringing tone signal, transmitting said one operation mode command signal from said first modem to said second modem after a connection has been completed therebetween via analog telephone line;

if said one operation mode command signal corresponds to an operation mode included in the second set of selected operation modes, setting an operation mode of said second modem to the operation mode corresponding to said one operation mode command signal;

transmitting an answer signal from the second modem to the first modem; and transmitting a transmission/receipt ready signal from the first and second modems to, respectively, the first and second terminals after said match has occurred.

6. The method for controlling a communications system of claim 5, further comprising the steps of:

if said one operation mode command signal does not correspond to an operation mode included in the second set of selected operation modes, transmitting from said second modem to said first modem another operation mode command signal which corresponds to an operation mode included in the second set of selected operation modes;

if said other operation mode command signal corresponds to an operation mode included in the first set of selected operation modes, setting an operation mode of said first modem to the operation mode corresponding to said other operation mode command signal;

transmitting said other operation mode command signal from the first modem to said second modem;

setting an operation mode of said second modem to the operation mode correspnding to said other operation mode signal received from said first modem;

transmitting said answer signal from the second modem to the first modem; and transmitting said transmission/receipt ready signal from the first and second modems to, respectively, the first and second terminals after said match has occurred.

7. A method for controlling a communications system by matching an operation mode of a first data circuit terminating equipment ("DCE") with an operation mode at least a second DCE, said communications system including a first terminal equipment ("DTE") coupled to a communications network via said first DCE, and a second DTE coupled to said communications network via said second DCE, wherein said method comprises the steps off:

providing said first DCE with a first set of selected operation modes, and providing said second DCE with a second set of selected operation modes such that said first and second DCE's can be set to operate in any one of said first and second sets of selected operation modes, respectively;

storing operation mode command signals in said first DTE corresponding to said first set of selected operation modes, and storing in said second DTE operation mode command signals corresponding to said second set of selected operation modes;

transmitting from said second DTE to said second DCE one of said operation mode command signals corresponding to said first set of selected operation modes in accordance with a start-up operation triggered by said second DTE;

following receipt by the second DCE of a ringing tone signal, transmitting said one operation mode command signal from said second DCE to said first DCE after a connection has been completed therebetween via said said communications network;

if said one operation mode command signal corresponds to an operation mode included in the first set of selected operation modes, setting an operation mode of said first DCE to the operation mode corresponding said one operation mode command signal;

transmitting an answer signal from the second DCE to the first DCE; and transmitting a transmission/receipt ready signal from the first and second DCE's to, respectively, the first and second DTE's after said match has occurred.

8. The method for controlling a communications system of claim 7, further comprising the steps of:

if said one operation mode command signal does not correspond to an operation mode included in the first set of selected operation modes, transmitting from said first DCE to said second DCE another operation mode command signal which corresponds to an operation mode included in the first set of selected operation modes;

if said other operation mode command signal corresponds to an operation mode included in the second set of selected operation modes, setting an operation mode of said second DCE to the operation mode corresponding to said other operation mode command signal;

transmitting said other operation mode command signal from the second DCE to said first DCE;

setting an operation mode of said first DCE to the operation mode corresponding said other operation mode signal received from said second DCE;

transmitting said answer signal from the second DCE to the first DCE; and transmitting said transmission/receipt ready signal from the first and second DCE's to, respectively, the first and second DTE's after said match has occurred.

9. A method for controlling a communications system by matching an operation mode of a first modem with an operation mode of at least a second modem, said communications system including a first terminal coupled to an analog telephone line via said first modem, and a second terminal coupled to said analog telephone line via said second modem, wherein said method comprises the steps of:

providing said first modem with a first set of selected operation modes, and providing said second modem with a second set of selected operation modes such that said first and second modems can be set to operate in any one of said first and second sets of selected operation modes, respectively;

storing operation mode command signals in said first terminal corresponding to said first set of selected operation modes, and storing in said second terminal operation mode command signals corresponding to said second set of selected operation modes;

transmitting from said second terminal to said second modem one of said operation mode command signals corresponding to said second set of selected operation modes in accordance with a start-up operation triggered by said second terminal;

following receipt by the second modem of a ringing tone signal, transmitting said one operation mode command signal from said second modem to said first modem after a connection has been completed therebetween via said analog telephone line;

if said one operation mode command signal corresponds to an operation mode included in the first set of selected operation modes, setting an operation mode of said first modem to the operation mode corresponding to said one operation mode command signal;

transmitting an answer signal from the second modem to the first modem; and transmitting a transmission/receipt ready signal from the first and second modems to, respectively, the first and second terminals after said match has occurred.

10. The method for controlling a communications system of claim 9, further comprising the steps of:

if said one operation mode command signal does not correspond to an operation mode included in the first set of selected operation modes, transmitting from said first modem to said second modem another operation mode command signal which corresponds to an operation mode included in the first set of selected operation modes;

if said other operation mode command signal corresponds to an operation mode included in the second set of selected operation modes, setting an operation mode of said second modem to the operation mode corresponding to said other operation mode command signal;

transmitting said other operation mode command signal from the second modem to said first modem;

setting an operation mode of said first modem to the operation mode corresponding to said other operation mode signal received from said second modem;

transmitting said answer signal from the second modem to the first modem; and transmitting said transmission/receipt ready signal from the first and second modems to, respectively, the first and second terminals after said match has occurred.

11. A communications system, comprising:

a first terminal coupled to a communications network via a first data circuit terminating equipment ("DCE");

a second terminal coupled to said communications network via a second DCE;

means to control said first and second terminals for respectively communicating with said first and second DCE's in a synchronous mode;

wherein said first terminal comprises
means for storing an initial operation mode of said second DCE; and
means for sending from the first terminal to the first DCE an operation mode setting command corresponding to said initial operation mode before said first terminal issues to or receives from the communications network a call via said first DCE; and wherein said first DCE includes
means for analyzing said operation mode setting command; and
means for controlling said first DCE to have an operation mode which matches said initial operation mode of said second DCE in response to an output of said analyzing means.

12. A communications system, comprising:

a first terminal coupled to an analog telephone line via a first modem;

a second terminal coupled to said analog telephone line via a second modem;

means to control said first and second modems for respectively communicating with said first and second terminals in a synchronous mode;

wherein said first terminal includes
  means for storing an initial operation mode of said second modem; and
  means for sending from the first terminal to the first modem an operation mode setting command corresponding to said initial operation mode before said first terminal issues to or receives from the analog telephone line a call via said first modem; and
wherein said first modem includes
  means for analyzing said operation mode setting command; and
  means for controlling said first modem to have an operation mode which matches said initial operation mode of said second modem in response to an output of said analyzing means.

13. A communications system, comprising:
  a first terminal equipment ("DTE") coupled to a communications network via a first data circuit terminating equipment ("DCE");
  a second DTE coupled to said communications network via a second DCE;
  means for providing said first DCE with a first set of selected operation modes, and for providing said second DCE with a second set of selected operation modes such that said first and second DCE's can be set to operate in any one of said first and second sets of selected operation modes, respectively;
  means for storing operation mode command signals in said first DTE corresponding to said first set of selected operation modes, and means for storing in said second DTE operation mode command signals corresponding to said second set of selected operation modes;
  means for transmitting from said first DTE to said first DCE one of said operation mode command signals corresponding to said first set of selected operation modes in accordance with a start-up operation triggered by said first DTE;
  means for, following receipt by the second DCE of a ringing tone signal, transmitting said one operation mode command signal from said first DCE to said second DCE after a connection has been completed therebetween via said communications network;
  means for, if said one operation mode command signal corresponds to an operation mode included in the second set of selected operation modes, setting an operation mode of said second DCE to the operation mode corresponding to said one operation mode command signal;
  means for transmitting an answer signal from the second DCE to the first DCE; and
  means for transmitting a transmission/receipt ready signal from the first and second DCE's to, respectively, the first and second DTE's after said match has occurred.

14. The communications system of claim 13, further comprising:
  means for, if said one operation mode command signal does not correspond to an operation mode included in the second set of selected operation modes, transmitting from said second DCE to said first DCE another operation mode command signal which corresponds to an operation mode included in the second set of selected operation modes;
  means for, if said other operation mode command signal corresponds to an operation mode included in the first set of selected operation modes, setting an operation mode of said first DCE to the operation mode corresponding to said other operation mode command signal;
  means for transmitting said other operation mode command signal from the first DCE to said second DCE;
  means for setting an operation mode of said second DCE to the operation mode corresponding to said other operation mode signal received from said first DCE;
  means for transmitting said answer signal from the second DCE to the first DCE; and
  means for transmitting said transmission/receipt ready signal from the first and second DCE's to, respectively, the first and second DTE's after said match has occurred.

15. A communications system, comprising:
  a first terminal coupled to an analog telephone line via a first modem;
  a second terminal coupled to said analog telephone line via a second modem;
  means for providing said first modem with a first set of selected operation modes, and for providing said second modem with a second set of selected operation modes such that said first and second modems can be set to operate in any one of said first and second sets of selected operation modes, respectively;
  means for storing operation mode command signals in said first terminal corresponding to said first set of selected operation modes, and means for storing in said second terminal operation mode command signals corresponding to said second set of selected operation modes, said operation mode command signals being comprised of combined codes composed of multi-frequency DTMF codes;
  means for transmitting from said first terminal to said first modem one of said operation mode command signals corresponding to said first set of selected operation modes in accordance with a start-up operation triggered by said first terminal;
  means for, following receipt by the second modem of a ringing tone signal, transmitting said one operation mode command signal from said first modem to said second modem after a connection has been completed therebetween via said analog telephone line;
  means for, if said one operation mode command signal corresponds to an operation mode included in the second set of selected operation modes, setting an operation mode of said second modem to the operation mode corresponding to said one operation mode command signal;
  means for transmitting an answer signal from the second modem to the first modem; and
  means for transmitting a transmission/receipt ready signal from the first and second modems to, respectively, the first and second terminals after said match has occurred.

16. The communications system of claim 15, further comprising:
  means for, if said one operation mode command signal does not correspond to an operation mode included in the second set of selected operation modes, transmitting from said second modem to said first modem another operation mode command signal which corresponds to an operation mode included in the second set of selected operation modes;

means for, if said other operation mode command signal corresponds to an operation mode included in the first set of selected operation modes, setting an operation mode of said first modem to the operation mode corresponding to said other operation mode command signal;

means for transmitting said other operation mode command signal from the first modem to said second modem;

means for setting an operation mode of said second modem to the operation mode corresponding to said other operation mode signal received from said first modem;

means for transmitting said answer signal from the second modem to the first modem; and means for transmitting said transmission/receipt ready signal from the first and second modems to, respectively, the first and second terminals after said match has occurred.

17. A communications system, comprising:

a first terminal equipment ("DTE") coupled to a communications network via a first data circuit terminating equipment ("DCE");

a second DTE coupled to said communications network via a second DCE;

means for providing said first DCE with a first set of selected operation modes, and for providing said second DCE with a second set of selected operation modes such that said first and second DCE's can be set to operate in any one of said first and second sets of selected operation modes, respectively;

means for storing operation mode command signals in said first DTE corresponding to said first set of selected operation modes, and for means for storing in said second DTE operation mode command signals corresponding to said second set of selected operation modes;

means for transmitting from said second DTE to said second DCE one of said operation mode command signals corresponding to said first set of selected operation modes in accordance with a start-up operation triggered by said second DTE;

means for, following receipt by the second DCE of a ringing tone signal, transmitting said one operation mode command signal from said second DCE to said first DCE after a connection has been completed therebetween via said communications network;

means for, if said one operation mode command signal corresponds to an operation mode included in the first set of selected operation modes, setting an operation mode of said first DCE to the operation mode corresponding to said one operation mode command signal;

means for transmitting an answer signal from the second DCE to the first DCE; and means for transmitting a transmission/receipt ready signal from the first and second DCE's to, respectively, the first and second DTE's after said match has occurred.

18. The communications system of claim 17, further comprising:

means for, if said one operation mode command signal does not correspond to an operation mode included in the first set of selected operation modes, transmitting from said first DCE to said second DCE another operation mode command signal which corresponds to an operation mode included in the first set of selected operation modes;

means for, if said other operation mode command signal corresponds to an operation mode included in the second set of selected operation modes, setting an operation mode of said second DCE to the operation mode corresponding to said other operation mode command signal;

means for transmitting said other operation mode command signal from the second DCE to said first DCE;

means for setting an operation mode of said first DCE to the operation mode corresponding to said other operation mode signal received from said second DCE;

means for transmitting said answer signal from the second DCE to the first DCE; and means for transmitting said transmission/receipt ready signal from the first and second DCE's to, respectively, the first and second DTE's after said match has occurred.

19. A communications system, comprising:

a first terminal coupled to an analog telephone line via a first modem;

a second terminal coupled to said analog telephone line via a second modem;

means for providing said first modem with a first set of selected operation modes, and for providing said second modem with a second set of selected operation modes such that said first and second modems can be set to operate in any one of said first and second sets of selected operation modes, respectively;

means for storing operation mode command signals in said first terminal corresponding to said first set of selected operation modes, and means for storing in said second terminal operation mode command signals corresponding to said second set of selected operation modes;

means for transmitting from said second terminal to said second modem one of said operation mode command signals corresponding to said second set of selected operation modes in accordance with a start-up operation triggered by said second terminal;

means for, following receipt by the second modem of a ringing tone signal, transmitting said one operation mode command signal from said second modem to said first modem after a connection has been completed therebetween via said analog telephone line;

means for, if said one operation mode command signal corresponds to an operation mode included in the first set of selected operation modes, setting an operation mode of said first modem to the operation mode corresponding to said one operation mode command signal;

means for transmitting an answer signal from the second modem to the first modem; and means for transmitting a transmission/receipt ready signal from the first and second modems to, respectively, the first and second terminals after said match has occurred.

20. The communications system of claim 19, further comprising:

means for, if said one operation mode command signal does not correspond to an operation mode included in the first set of selected operation modes, transmitting from said first modem to said second modem another operation mode command signal which correspond to an operation mode included in the first set of selected operation modes;

means for, if said other operation mode command signal corresponds to an operation mode included in the second set of selected operation modes, setting an operation mode of said second modem to the operation mode corresponding to said other operation mode command signal;

means for transmitting said other operation mode command signal from the second modem to said first modem;

means for setting an operation mode of said first modem to the operation mode corresponding to said other operation mode signal received from said second modem;

means for transmitting said answer signal from the second modem to the first modem; and means for transmitting said transmission/receipt ready signal from the first and second modems to, respectively, the first and second terminals after said match has occurred.

* * * * *